(12) United States Patent
Lemke et al.

(10) Patent No.: US 7,409,224 B1
(45) Date of Patent: *Aug. 5, 2008

(54) METHOD AND APPARATUS FOR SELECTION OF ONE DATA SET FROM AMONG MULTIPLE RELATED DATA SETS AND BEAMING THE SELECTED DATA SET

(75) Inventors: Steve Lemke, Sunnyvale, CA (US); Roger Flores, Redwood City, CA (US); Guy McIlroy, Sunnyvale, CA (US); Chris Raff, San Francisco, CA (US)

(73) Assignee: PalmSource, Inc., Sunnyvale, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 10/927,268

(22) Filed: Aug. 25, 2004

Related U.S. Application Data (63) Continuation of application No. 09/773,703, filed on Jan. 31, 2001, now Pat. No. 6,816,725.

(51) Int. Cl.
*H04M 1/00* (2006.01)
(52) U.S. Cl. ............ 455/556.2; 455/41.2; 455/39; 340/825.72; 379/93.18; 715/784
(58) Field of Classification Search ....... 455/41.1–41.3, 455/556.1–556.2, 458, 466, 419–420, 566, 455/558, 414.1–414.3; 705/41; 707/10; 709/200, 206; 379/93.23, 93.09, 93.18; 345/169; 340/825.71–825.72
See application file for complete search history.

(56) References Cited

U.S. PATENT DOCUMENTS

| | | | | |
|---|---|---|---|---|
| 5,201,067 A | * | 4/1993 | Grube et al. ............ | 455/556.1 |
| 5,754,636 A | * | 5/1998 | Bayless et al. ........... | 379/142.1 |
| 5,768,362 A | * | 6/1998 | Moon .................... | 379/355.05 |
| 5,835,574 A | * | 11/1998 | Lam ....................... | 379/90.01 |
| 5,923,327 A | * | 7/1999 | Smith et al. .............. | 715/784 |
| 6,084,951 A | * | 7/2000 | Smith et al. ............. | 379/93.17 |
| 6,175,741 B1 | * | 1/2001 | Alperovich ................ | 455/458 |
| 6,256,129 B1 | * | 7/2001 | Kim et al. ................. | 398/129 |
| 6,308,083 B2 | * | 10/2001 | King ....................... | 455/556.1 |
| 6,370,389 B1 | * | 4/2002 | Isomursu et al. ........... | 455/466 |

(Continued)

*Primary Examiner*—Sharad Rampuria
(74) *Attorney, Agent, or Firm*—Berry & Associates P.C.

(57) ABSTRACT

A method and system of selecting one set of data from among multiple related data sets and beaming the data set from one handheld electronic device to another handheld electronic device. One embodiment discloses a method and system, which uses multiple cards, one for each category. The transmitter of the business card can transmit a business card from the active category of the device. Upon an attempt to transmit a business card from a category which does not have a preselected business card, the system issues a warning providing the user with a selection. The user has choices of sending a business card from any one category with pre-defined business card or sends a pre-defined default business card. In another embodiment, the transmitter of the business card can make a selection of a business card from a number of predefined electronic cards in the system and upon review of the business cards on the screen the user may decide to send the selected business card. In a third embodiment the transmitter of the business can edit a pre-defined business card and may make appropriate changes to the data field in the business card before transmitting it to the second device.

20 Claims, 12 Drawing Sheets

U.S. PATENT DOCUMENTS

| | | | |
|---|---|---|---|
| 6,389,278 B1 * | 5/2002 | Singh | 455/414.3 |
| 6,799,035 B1 * | 9/2004 | Cousins | 455/418 |
| 6,816,725 B1 * | 11/2004 | Lemke et al. | 455/414.1 |
| 6,959,207 B2 * | 10/2005 | Keinonen et al. | 455/567 |
| 6,961,590 B1 * | 11/2005 | Toebes | 455/564 |
| 7,058,686 B2 * | 6/2006 | Jin | 709/206 |
| 2002/0065868 A1 * | 5/2002 | Lunsford et al. | 709/200 |

* cited by examiner

ADDRESS

FIRST NAME          LAST NAME

BUSINESS ADDRESS

HOME ADDRESS

TITLE

COMPANY NAME

BUSINESS PHONE

HOME PHONE

FAX BUSINESS

FAX HOME                    DONE

METHOD AND APPARATUS FOR SELECTION OF ONE DATA SET FROM AMONG MULTIPLE RELATED DATA SETS AND BEAMING THE SELECTED DATA SET

This is a continuation of application Ser. No. 09/773,703 filed on Jan. 31, 2001 now U.S. Pat. No. 6,816,725.

BACKGROUND OF THE INVENTION

1. Field of the Invention

The present invention relates to the field of computer systems and database technology. More specifically an embodiment of the present invention relates to the field of portable electronic devices, such as personal digital assistants (PADs), cell phones, pagers, etc.

2. Related Art

Electronic organizers were introduced to the market years ago. These devices were commonly used to store and maintain address books, telephone listings and daily activity schedules albeit with limited number of records due to limited storage capacity. Subsequent development of such devices introduced limited capability calculating functions, weekly and monthly scheduling "to do lists" and business card files. The most noticeable developments in this family of devices, in the recent years, are increased memory size, reduced physical size, communication capabilities and increased functionality.

The recent emergence of Personal Digital Assistant, commonly known as PDA, introduced a new type of organizers. The PDA's have capability to store telephone numbers, addresses, daily appointments and software that keeps track of business or personal data such as expenses. Furthermore, present PDAs have the capability to synchronize to a personal computer, thus enabling the two devices to exchange updated information together. Additionally, the PDA can connect to a modem, enabling it to have electronic mail (e-mail) capabilities. Another recent development in PDA technology is capability to browse Web pages located on the Internet and synchronize, e.g., HotSync, with another device or with a compatible personal computer. Moreover, an advanced PDA can have Internet capabilities to communicate over a wireless interface. (e.g. radio interface).

A typical PDA user often uses the device during a business meeting. The user can easily access his/her customized telephone directory, schedule business activities, send and receive e-mails, and connect to the Internet. More advanced PDA devices, such as hand-held computer systems, have the capability to exchange certain category of information such as an electronic business card.

The advent of business and personal cards has facilitated such an exchange of information to a great degree. Through the years, the purpose of such an exchange has remained the same but the need for the exchange of information grew rapidly with the growth of society and with information technology.

The introduction of electronic business cards to the business community has proven to be a success. Nowadays, beaming an electronic business card to a business partner in a business meeting is rather common and considered an exercise of efficiency. Electronic exchange of business cards is gradually replacing the traditional exchange of paper business cards at business meetings as well as at the variety of social gatherings.

The exchange of electronic business cards between owners of electronic devices may have been first introduced in the business communities. The purpose for the exchange of business cards between business associates still remains the same and it is designed to invite possible future contacts. Social gatherings are no exception to this practice and the same exchange of information takes place everyday and at all levels of social gathering or other special events.

The type of information exchanged during these different events is not the same. One who is seeking a future business contact is interested in different information than the one who seeks a future social contact. The information on a business card may include business telephone number, business address, business fax number, and business e-mail. On the other hand, the information on a personal card may merely include personal information and no business related information, (i.e., home telephone number, home address home fax number and other personal information).

Furthermore, people are often in situations where neither their business cards nor their personal cards contains the sort of information they wish to share with another person in that particular occasion. In a particular occasion, one may wish to share some of the information on his/her business card with another person but not all of the information on that card. The situation can even be worst when one wishes to exclude some of the information on a particular card and add some other information on that same card.

To overcome such problems, in the past, people often carried different cards for different occasions. One might have carried a stack of business cards; for instance, a stack of personal related cards and another stack relating to his/her social activities. Depending upon the nature of social or business occasion, he/she would reach into a stack of different cards and would sort out the right card for the occasion. Carrying a number of single purpose paper cards is generally voluminous and awkward. Aside from the bulkiness of the cards, managing the cards and sorting them out at the time of exchange is inconvenient and time consuming.

This need arises from the fact that the user of such devices is not just associating with a group of business associates. They may have other people with whom they have daily contacts. A user of such device may want to exchange his electronic business card with a business associate in one occasion and immediately thereafter, in another occasion, exchange an electronic card with a casual friend. The user, most probably, does not want to include his home telephone number in the former exchange of electronic business card and not to include his professional title or other very formal information in the latter case.

Presently a convenient method for exchange of different electronic business cards is not available in the marketplace.

SUMMARY OF THE INVENTION

Embodiments of the present invention enable an owner of a handheld electronic device to select or edit and transmit an electronic card from a number of different cards defined and stored in the device. The stored cards in the device include business cards as well as personal cards categorized for use in different occasions. When the user of a device attempts to transmit an electronic card, the device displays the list of all available electronic cards on its display screen. The user then has the option of selecting and transmitting selects and transmits one card from a number of different cards, which most appropriately fits the occasion. Furthermore, embodiments of this invention enable the user to edit and customize any selected card to fit the particular purpose and occasion.

These and other objects and advantages of the present invention will no doubt become obvious to those of ordinary skill in the art after having read the following detailed description of the preferred embodiment which are illustrated in the various drawing figures.

Specifically, the present invention discloses a method and a system for selecting one set of data from among multiple related data sets and beaming the data set from one handheld electronic device to another handheld electronic device. An embodiment of the present invention discloses a method and system for selectively transmitting business cards from one device to another device. The transmitter of the business card makes a selection of the business card from multiple categories of business cards and upon review of the business cards on the screen will decide to send or not to send the selected card. In another embodiment, the transmitter can edit the business card and make appropriate changes before transmitting it to the other device. In one embodiment, if the transmitter of the business card attempts to transmit a business card from a category, which does not have a pre-defined business card, the system will issues a warning. In response to the warning, the user has choices of sending a business card from those categories with pre-defined business card or sends a pre-defined default business card.

In one embodiment of this invention the device transmits an electronic business card from the active category at the time of beaming. In case the active category does not have a pre-defined business or personal card, a warning by the system notifies the user of the status. The user then may select to send a card from another category with a pre-defined electronic card or he/she may decide to send a "DEFAULT" card. The active category may be the active category during the last session with the device or a category selected by the current user of the device.

In one embodiment, the user requests to transmit an electronic business card by pressing the appropriate button designed for beaming electronic business cards. Alternatively, a menu navigation to a beam option can be done. A business card from the active category will automatically be transmitted if there is a pre-defined electronic card in that active category. If the active category does not have a pre-defined electronic business card, or when the active category is the "ALL" category, this embodiment causes the device to present the user with a warning. The warning states that the current category is either without a pre-defined electronic card or the active category is "ALL" category. The user is given a choice of selection between 1) transmitting an electronic card from another category with pre-defined card or 2) transmitting the pre-defined "DEFAULT" card. The active category is that category last used by the user to obtain information.

For example, assume that the user has not defined an electronic business card for the "FAMILY RELATIVES" category but has defined an electronic business card for all other named categories. Assume further, that the user is in a situation that he/she needs to transmit an electronic card to a person he/she just met. Even further assume that during the last session with the device category was left on "FAMILY RELATIVES" before the session was terminated. The user turns the system on and attempts to transmit an electronic card. The user will be immediately warned that the active category is "FAMILY RELATIVES" and there is no pre-defined electronic personal card for that category. Following such a warning, this embodiment gives the user the choice of sending a card from other category with a pre-defined electronic card or sending the "DEFAULT" card.

In another embodiment, the user has a number of pre-defined business and personal cards, which can be transmitted without any change or modification. When the user wishes to transmit a card, the user presses the appropriate button on the first device, thus requesting transmission of an electronic card. The device displays the list of all pre-defined business or personal cards. Corresponding to each card there is a label. The label is designed to select the corresponding business or personal card when a box corresponding to that card is pressed for a predetermined duration. The user can then transmit the particular business card by tapping the appropriate label.

In another embodiment, the user of the device is given the choice of modifying the electronic card before transmission. The user has pre-defined a business/personal card in his/her electronic device. When the occasion arises for transmission of the business card, the user displays an available business card on the display screen. This embodiment enables the user to modify any one or several fields of the selected card to fit the requirement of the user before the user decides to transmit the card to another device. Once the user edits the business card appropriate for the occasion, the user transmits the edited card by pressing the "BEAM" or done button on the display screen. For example, the user may wish to transmit an electronic business card to a family member but he does not have family member category. In such situations, the user can display an existing electronic business or personal card and edit the fields as required by the situation. The user may want to add his home fax number or may wish to add another home telephone number to the card, or delete information, which he/she would not normally share with non-family members.

DETAILED DESCRIPTION OF THE INVENTION

Reference will now be made in detail to the preferred embodiments of the present invention, selection of one electronic business card from among multiple electronic business cards or editing a business card and beaming the selected or edited business card to another electronic device, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

NOTATION AND NOMENCLATURE

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System Platform

The present invention is compatible with any electronic device having a screen. One of the common types of electronic systems, which can be used in accordance with one embodiment of the present invention, is referred to as a personal digital assistant, or commonly called a PDA. The PDA is a pocket sized electronic organizer with the capability to store telephone numbers, addresses, daily appointment, and software that keeps track of business or personal data such as expenses, etc. Furthermore, the PDA also has the ability to connect to a personal computer, enabling the two devices to exchange updated information that is synchronizing the information between the two devices. Additionally, the PDA can also be connected to a modem, enabling it to have electronic mail (e-mail) capabilities over the Internet along with other Internet capabilities. Moreover, an advanced PDA can have Internet capabilities over a wireless communication interface (e.g., radio interface). In particular, the PDA can be used to browse Web pages located on the Internet. The PDA can be coupled to a networking environment. It should be appreciated that embodiments of the present invention are well suited to operate within a wide variety of electronic systems (e.g., computer systems) which can be communicatively coupled to a networking environment, including cellular phones, pagers, etc.

Figure 1:
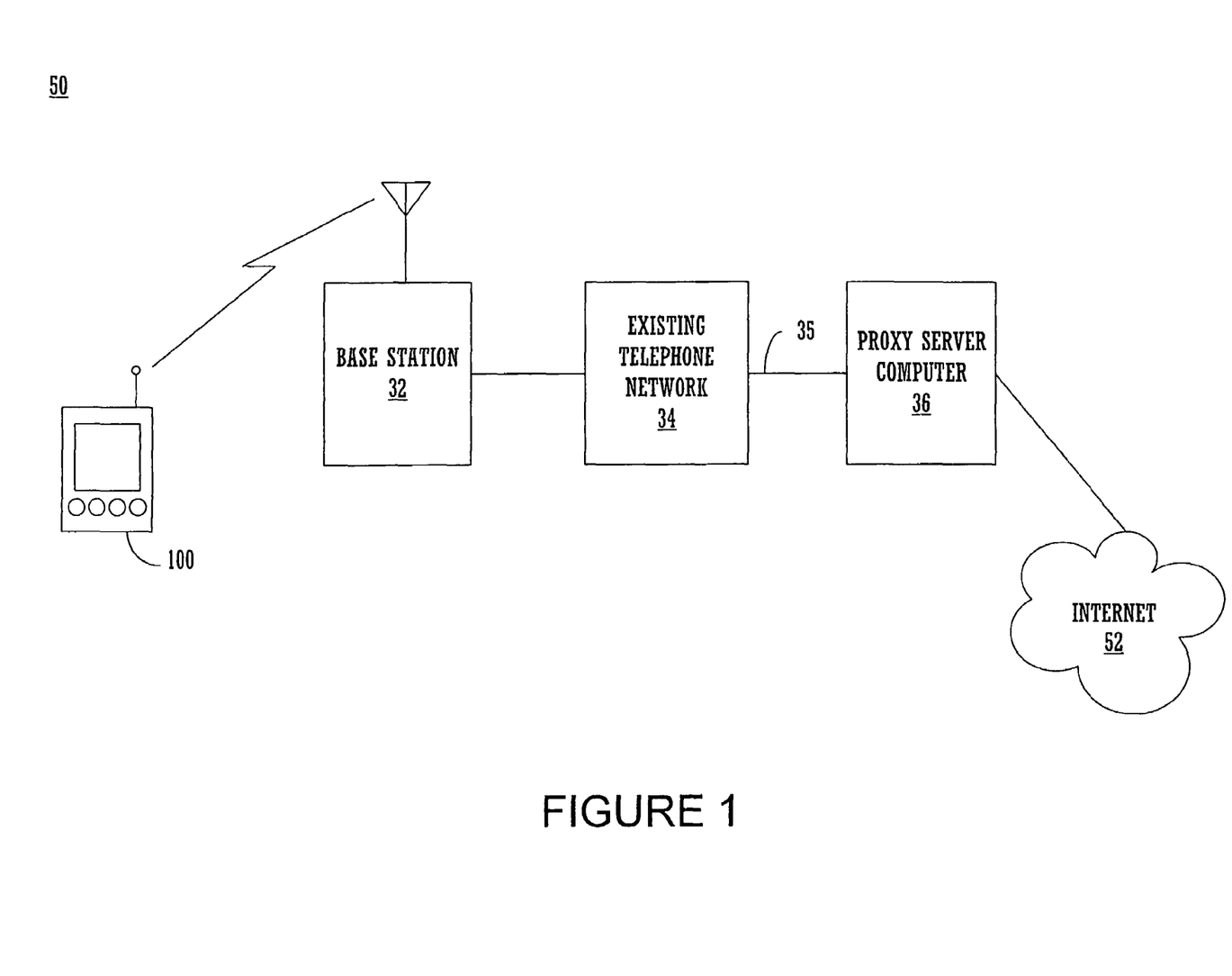
FIG. 1 illustrates a block diagram of a first exemplary network environment including a personal digital assistant in accordance with an embodiment of the present invention.

FIG. 1 is a block diagram of an exemplary network environment 50 including an exemplary personal digital assistant. The PDA 100 is also known as a palmtop or palm-sized electronic system or computer system. The PDA 100 has the ability to transmit and receive data and information over a wireless communication interface (e.g., a radio interface). The PDA 100 is one exemplary implementation on which the present invention can operate. The present invention can operate on any portable electronic system or device.

In one embodiment, base station 32 is both a transmitter and receiver base station, which can be implemented by coupling it into an existing public telephone network 34. Implemented in this manner, base station 32 enables the personal digital assistant 100 to communicate with a proxy server computer system 36, which is coupled by wire 35 to the existing public telephone network 34. Furthermore, proxy server computer system 36 is coupled to the Internet 52, thereby enabling the PDA 100 to communicate with the Internet 52. It should be further appreciated that other embodiments of a communications network may be utilized in accordance with the present invention.

The data and information which are communicated between base station 32 and the personal digital assistant 100 are a type of information and data that can conventionally be transferred and received over a public telephone wire network system. However, a wireless communication interface is utilized to communicate data and information between the PDA 100 and base station 32. It should be appreciated that one embodiment of a wireless communication system in accordance with the present invention is the Mobitex wireless communication system.

Figure 2A:
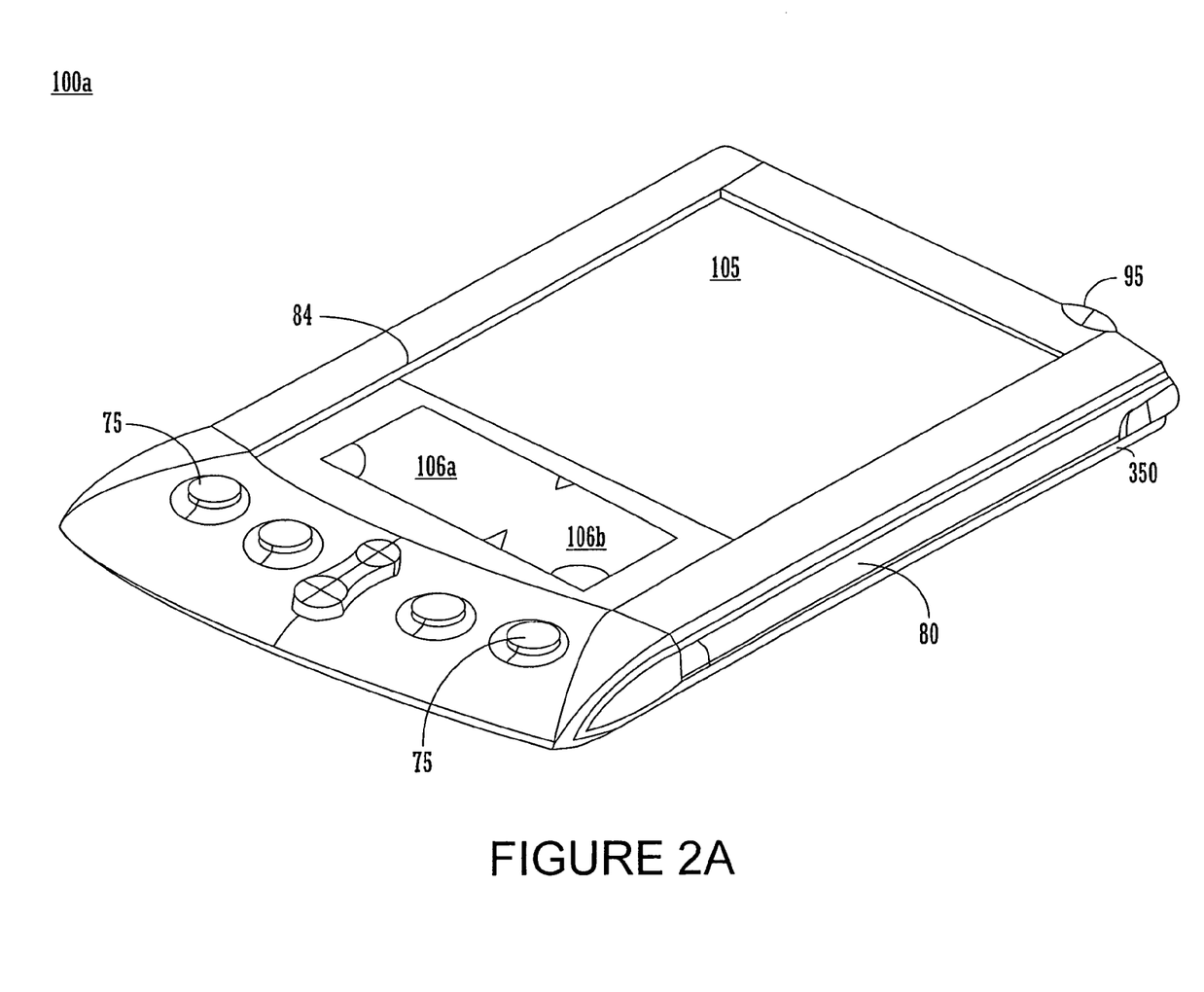
FIG. 2A is a topside perspective view of a palmtop computer system that can be used as a platform for the data entry and authentication embodiments of the present invention.

FIG. 2A is a perspective illustration of the top face 100a of one embodiment of the palmtop computer system. The top face 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a or 106b. The stroke information is then fed to an internal processor for automatic character recognition. Once characters are recognized, they are typically displayed on the screen for verification and/or modification.

Figure 2B:
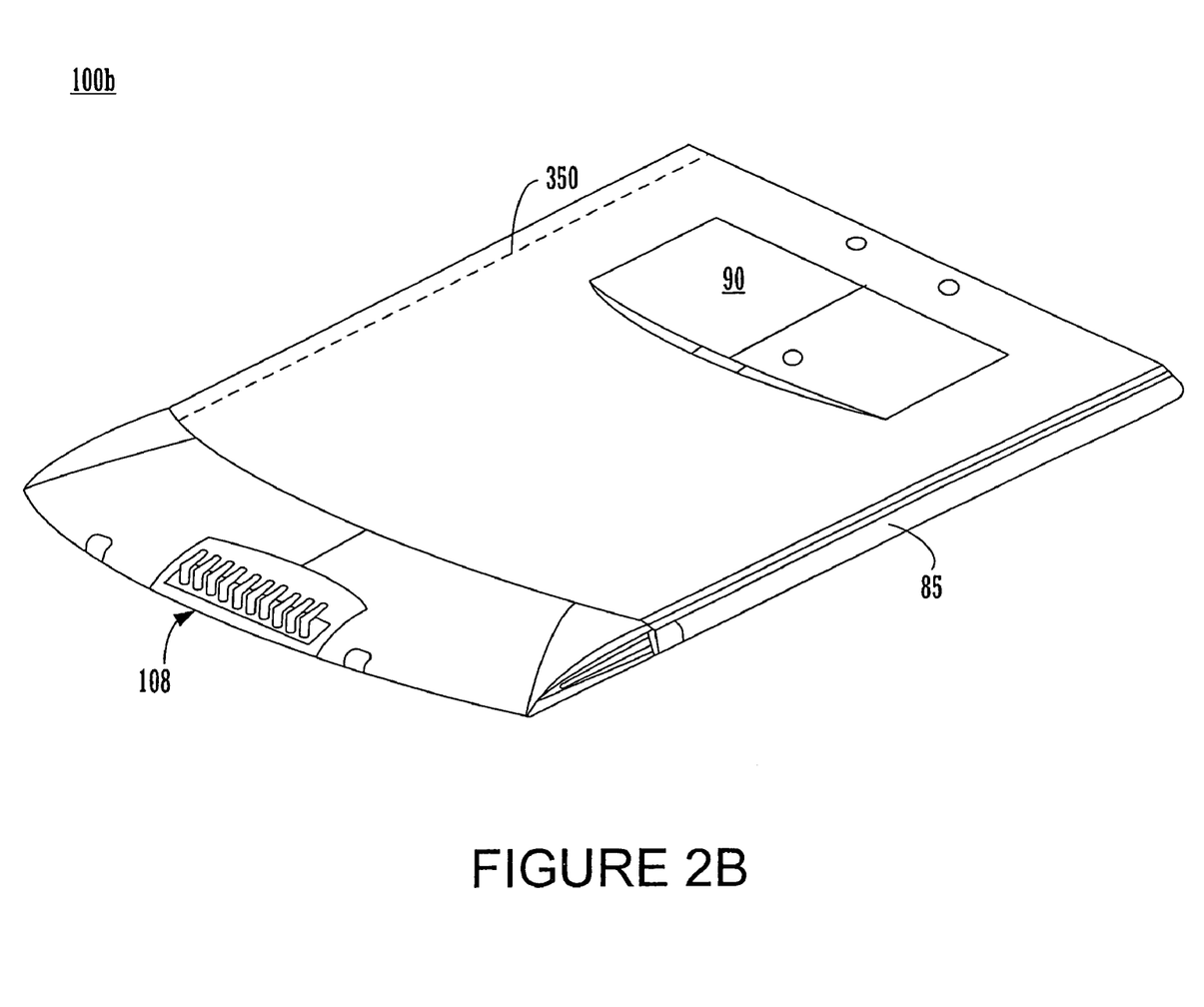
FIG. 2B is a bottom side perspective view of the palmtop computer system of FIG. 2A.

FIG. 2B illustrates the bottom side 100*b* of one embodiment of the palmtop computer system. An optional extendible antenna 85 is shown and also a battery storage compartment door 90 is shown. A communication interface 108 is also shown. In one embodiment of the present invention, the communication interface 108 is a serial communication port, but could also alternatively be of any of a number of well known communication standards and protocols, e.g., parallel, USB, SCSI, Firewire (IEEE 1394), Ethernet, etc. It is appreciated that interface 108 can also be used for charging current when using rechargeable batteries.

Figure 3:
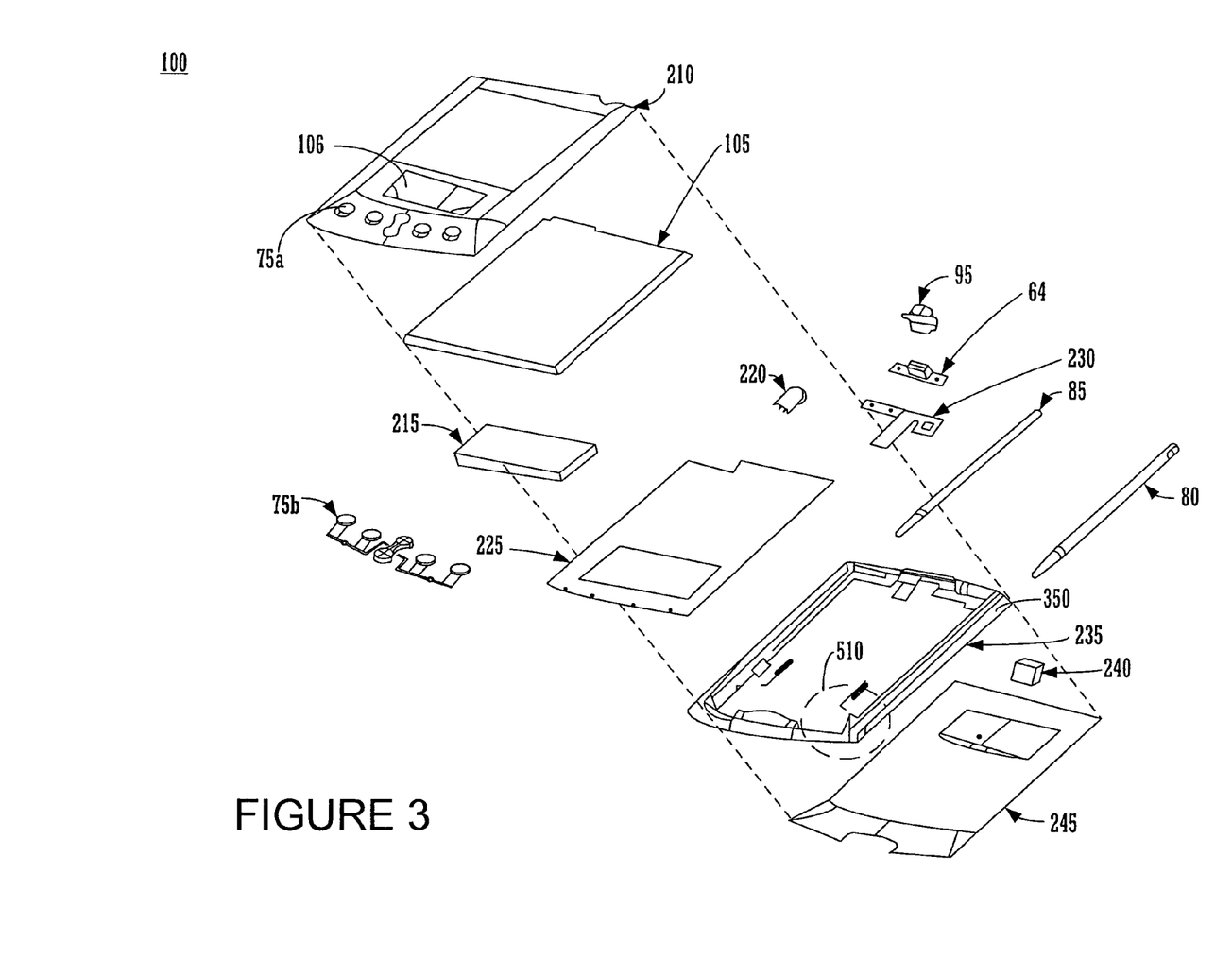
FIG. 3 is an exploded view of the components of the palmtop computer system of FIG. 2A.

FIG. 3 is an exploded view of the palmtop computer system 100 in accordance with one implementation. System 100 contains a front cover 210 having an outline of region 106 and holes 75*a* for receiving buttons 75*b*. A flat panel display 105 (both liquid crystal display and touch screen) fits into front cover 210. Any of a number of display technologies can be used, e.g., liquid crystal display (LCD), field emission display (FED), plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. A digitizer pad can be part of the display assembly or it can also be included in PC board 225. A midframe 235 is shown along with stylus 80. Position adjustable antenna 85 is shown.

Electronic Card Transmission

Embodiment of this invention enable the owner of an electronic handheld computer system to select one specific electronic business card and transmit that specific electronic business card to another electronic handheld computer. Specifically, embodiment of the invention enable a device owner to pre-define a number of business cards, each of which for a particular occasion (e.g., business, family, social, sports club, etc.) and even one can be defined for a general purpose occasion (e.g., a DEFAULT card). The device owner then can send a pre-defined card to the owner of another device an electronic business card appropriate for the particular occasion.

In case where an attempt is made to send an electronic business card from an active category and that category does not have a pre-defined business card, then the device may further notify the owner if there is no pre-designated data set for that active category, in which case the transmitter has an election to make; 1) send a pre-designated data set from another category; or 2) send the global data set. In case where the active information category is "ALL" category, then again the system may alert the transmitter of the situation and allows the transmitter to use the same election as stated above.

Figure 4:
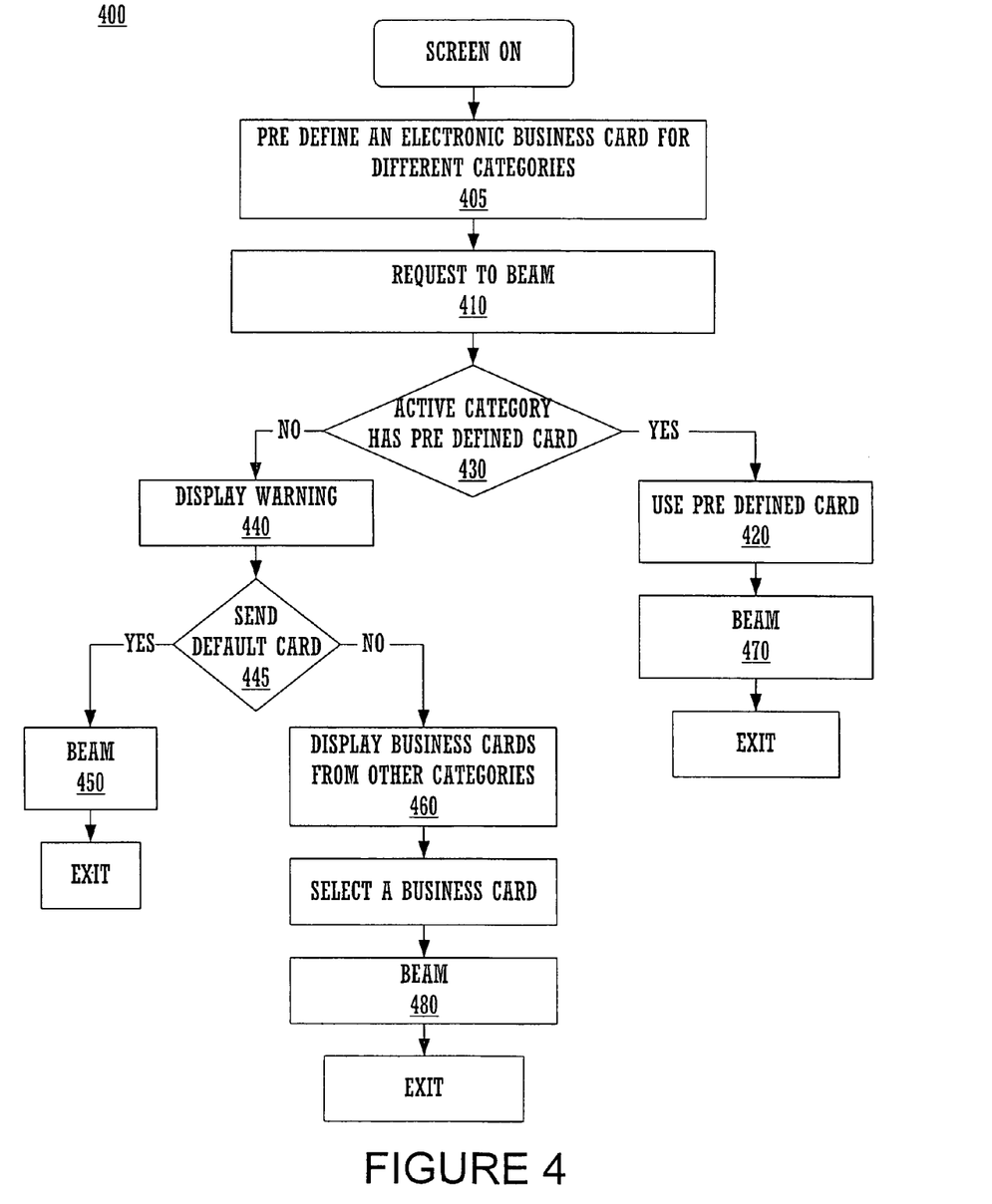
FIG. 4 illustrates a flow diagram of an embodiment of the present invention, when the transmission of an electronic card is from the active category.

FIG. 4 illustrates the flow diagram 400 of this embodiment when a user attempts to transmit an electronic business card from the active category of the database. The active category is the category of information that the user last obtained information from.

This embodiment of this invention allows the user to define an electronic business card for each category of the information in the database 405. Under this embodiment of the invention, it is not required that an electronic card be defined for all categories within the database. Also, the user can pre-define a "DEFAULT" card 405, which he/she could use during some unforeseen circumstances.

Figure 6:
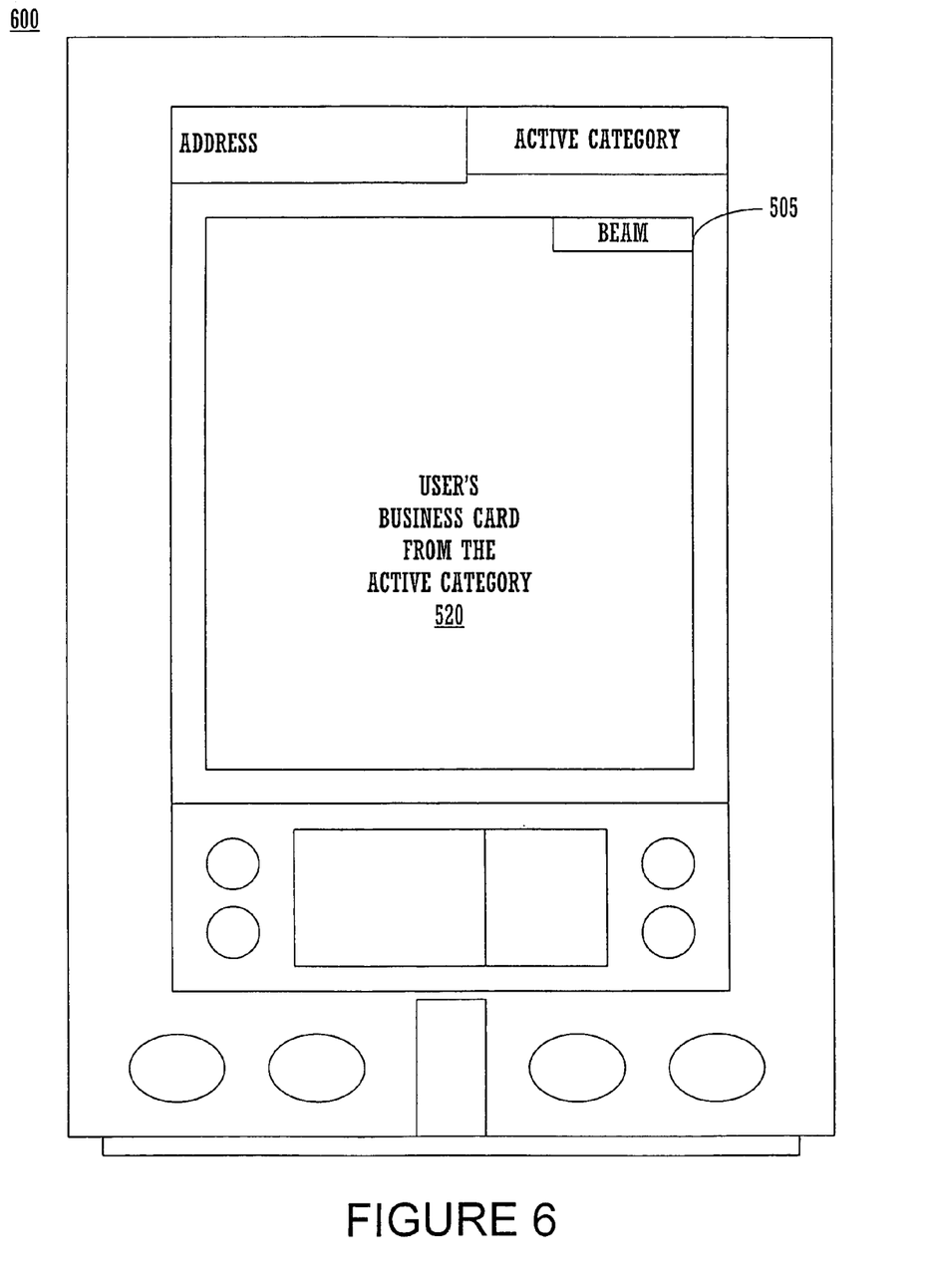
FIG. 6 illustrates the display screen of an electronic device when transmission from the active category is attempted and the device displays a selection of choices.

When the user of the transmitting device attempts to transmit an electronic card by requesting a beam 410, the device will automatically transmit an electronic business card from the active category if the active category has a pre-defined electronic business card 420. However, if the active category does not have a pre-defined electronic business card 430, this invention provides a warning to the user that an electronic business card for this category does not exist 440. In accordance with the embodiments of this invention, the user can request card transmission via a number of different ways. First a button can be held down for a predetermined duration. Second, user navigation through a set of commands and menus can be done to select a beam option. Any of a number of different mechanism can be used in the invention, further including the tapping of an on screen icon. The embodiment further gives a choice to the user, whether he/she wishes to 1) send the "DEFAULT" card 450 or, 2) send a card from categories with pre-defined business cards 460 as shown in FIG. 6. If the user chooses to transmit the DEFAULT card, the user simply taps the choice 1 on the screen 610, and optionally presses the appropriate section of the display screen 505 to beam the DEFAULT card.

Figure 7:
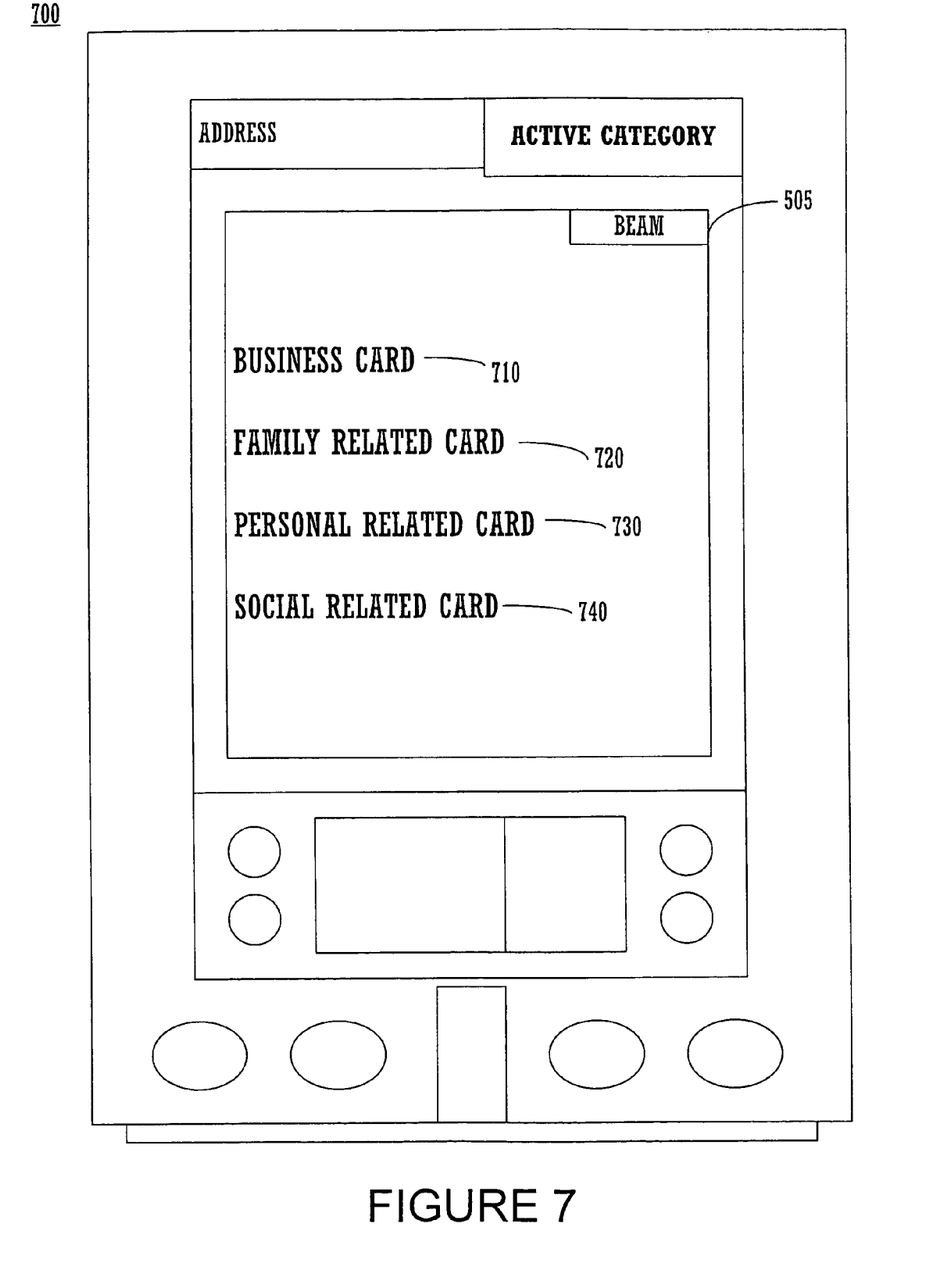
FIG. 7 illustrates user's selection of a choice in FIG. 6.

However, if the user decides that he/she chooses to send a pre-defined card 460 of FIG. 4, then he/she taps on choice 2 on the display screen 620 of FIG. 6. Selection of choice 2 causes a display of different categories of information with pre-defined electronic business cards as shown in FIG. 7. The user then can select from which category he/she wishes to transmit by tapping on that particular category 710, 720, 730 or 740, and then the device beams the card. Optionally, the user can also tap the display screen 505 to send the card to the second device. The response by the user will cause an electronic card to be transmitted to the second device.

Figure 5:
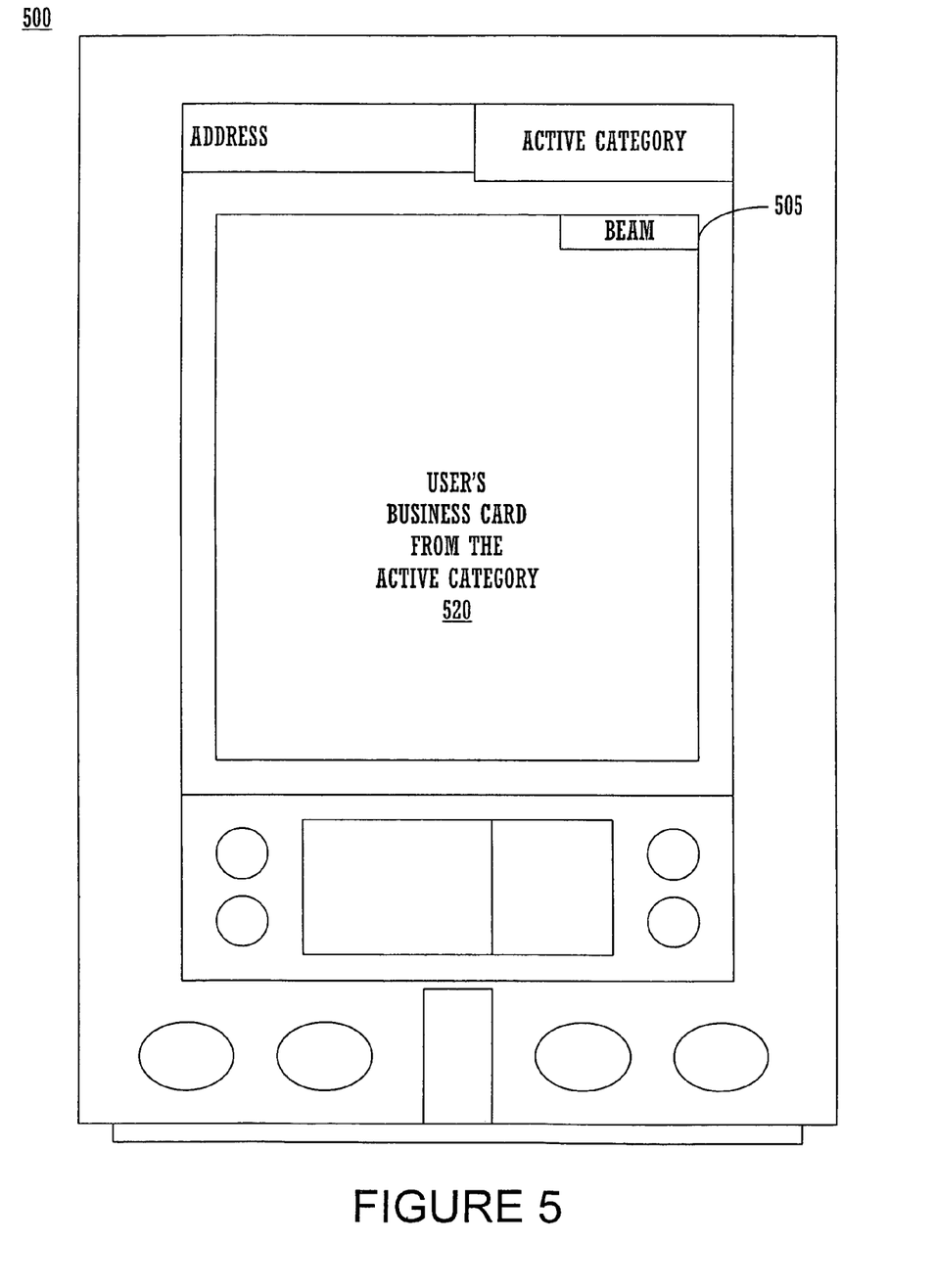
FIG. 5 illustrates the display screen of an electronic device when transmission is attempted from the active category.

FIG. 5 illustrates the situation where the active category has a pre-defined electronic business card. If the user decides to beam this business card from the active category, the user can optionally tap the area on the display screen 505 and beam the card to the second device. Alternatively, no screen display is generated and the pre-defined business card is automatically beamed upon the user invoking the beam option 410.

FIG. 6 illustrates a situation where the user starts a session and decides to beam an electronic business card from the active category but the active category does not have a pre-defined card. If the active category is "ALL" category or if the active category does not have a pre-defined electronic business card, this embodiment provides the user with a warning. A prompt or audible tone will appear on the screen or be generated and allow the user to select a choice of 1) DO YOU WANT TO SEND THE DEFAULT CARD? or 2) DO YOU WANT TO SEND A CARD FROM OTHER CATEGORY WITH PRE-DEFINED ELECTRONIC BUSINESS CARD?

The user may tap the screen on 610 selecting choice 1, and then optionally tap the display screen on area 505 to beam the DEFAULT card. The user may select choice 2 by tapping the screen on 620, deciding to send a card from a category with pre-defined electronic business card. If the user selects choice 2 and decides to send a pre-defined electronic card from a category with a pre-defined electronic business card, then a list of categories with pre-defined business cards will appear on the screen FIG. 7.

FIG. 7 illustrates the display screen depicting the list of all categories with pre-defined electronic business cards. The user can tap any one of the categories to select a card from that category and then the device will beam the selected card to the second device.

Figure 8:
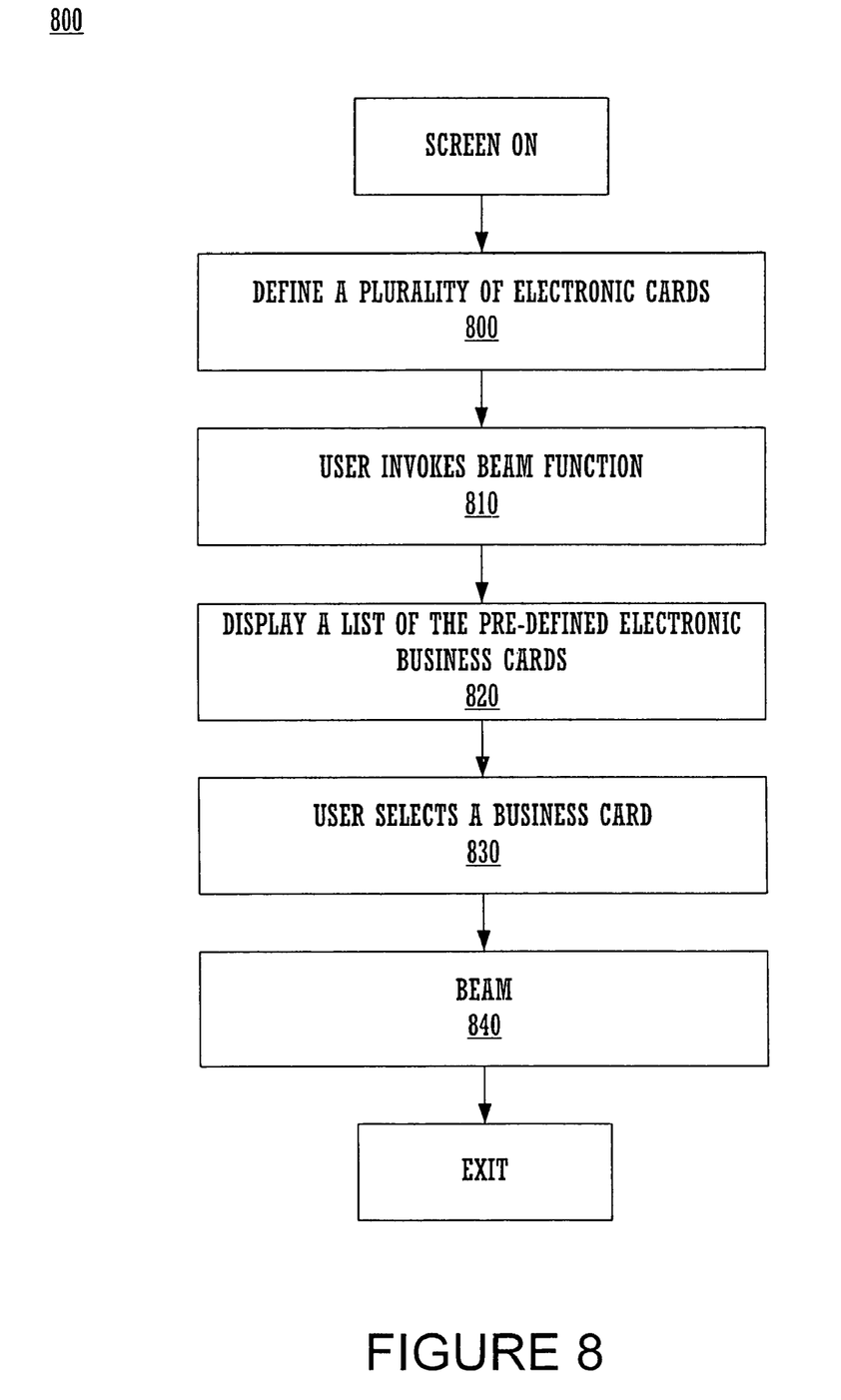
FIG. 8 illustrates the flow diagram of a dialogue session when all categories have pre-defined business/personal cards.

FIG. 8 illustrates the flow diagram 800 of another embodiment of the invention. In this case a session exists with the electronic device where an electronic card is to be transmitted from a list of pre-defined electronic cards. Initially, the user defines a plurality of electronic cards at 810. The screen displays 820 the list of electronic card names when the user requests beaming. The user then selects a card name 830 and the device beams the associated card 840.

Figure 9:
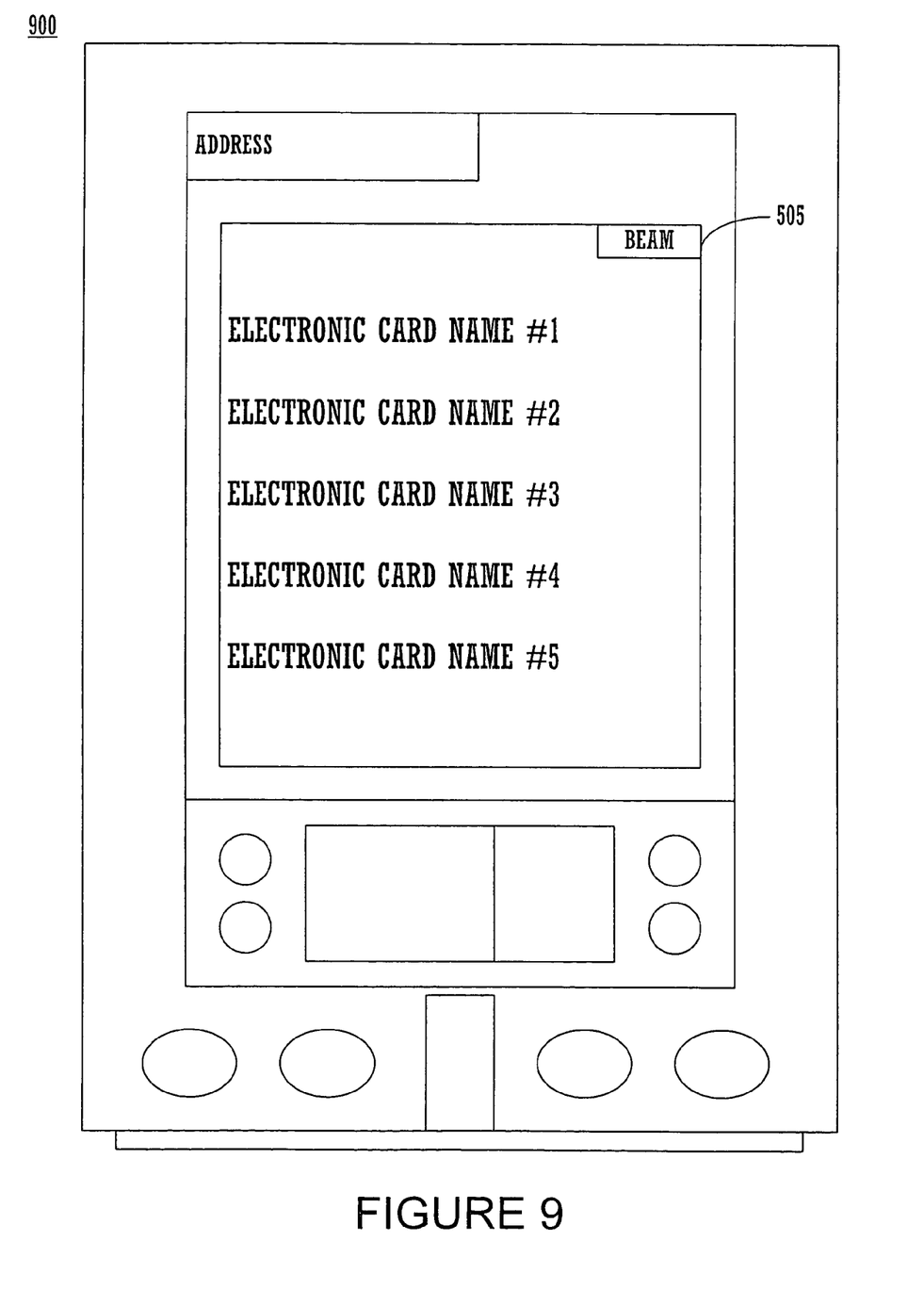
FIG. 9 illustrate the display screen of a device when the user is transmitting from a list of pre-defined electronic business card/personal cards.

FIG. 9 illustrates transmission of an electronic business card when transmission is from a pre-defined list of electronic cards. The user attempts to transmit an electronic card by invoking a beam and all pre-defined electronic cards appear on the screen. A list of card names appears. The user selects a card by tapping on the desired name to beam a card associated with the selected name.

Figure 10:
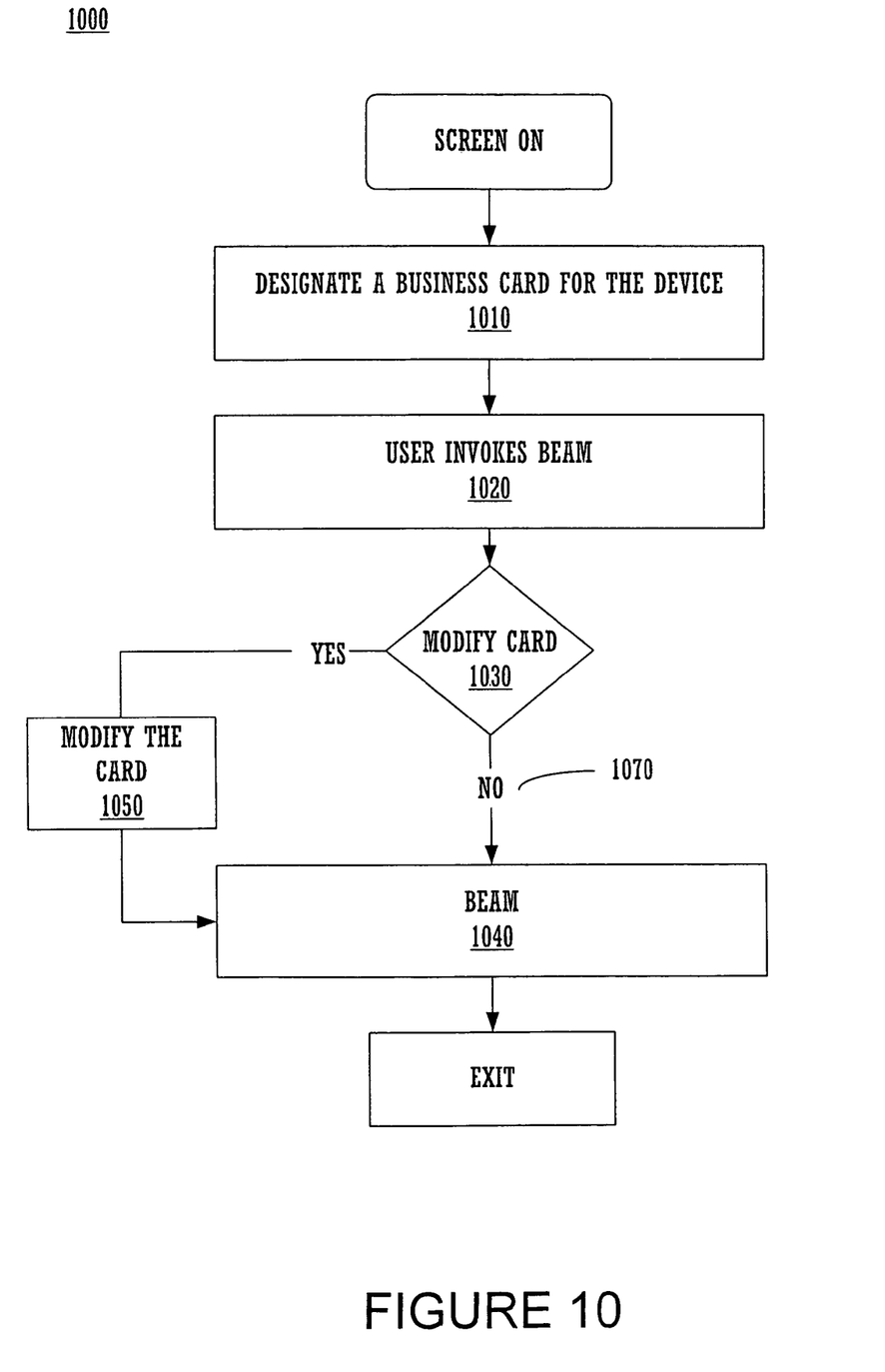
FIG. 10 illustrates the flow diagram of another embodiment of the present invention; a dialogue session with the device when the electronic card is modified before transmittal.

FIG. 10 illustrates a flow diagram 1000 of a session of another embodiment of the present invention where the user can edit and modify a field within an electronic card before transmitting the card to a second device. Initially, the user defines an electronic business card 1010 for each device. When the user wishes to transmit the business card, the user invokes the beam command 1020, which displays the pre-defined card.

The user is allowed to make a selection of choices 1) SEND the card without modification 1070 or 2) TO EDIT AND MODIFY THE FIELDS within the card 1050 before beaming the card.

Figure 11:
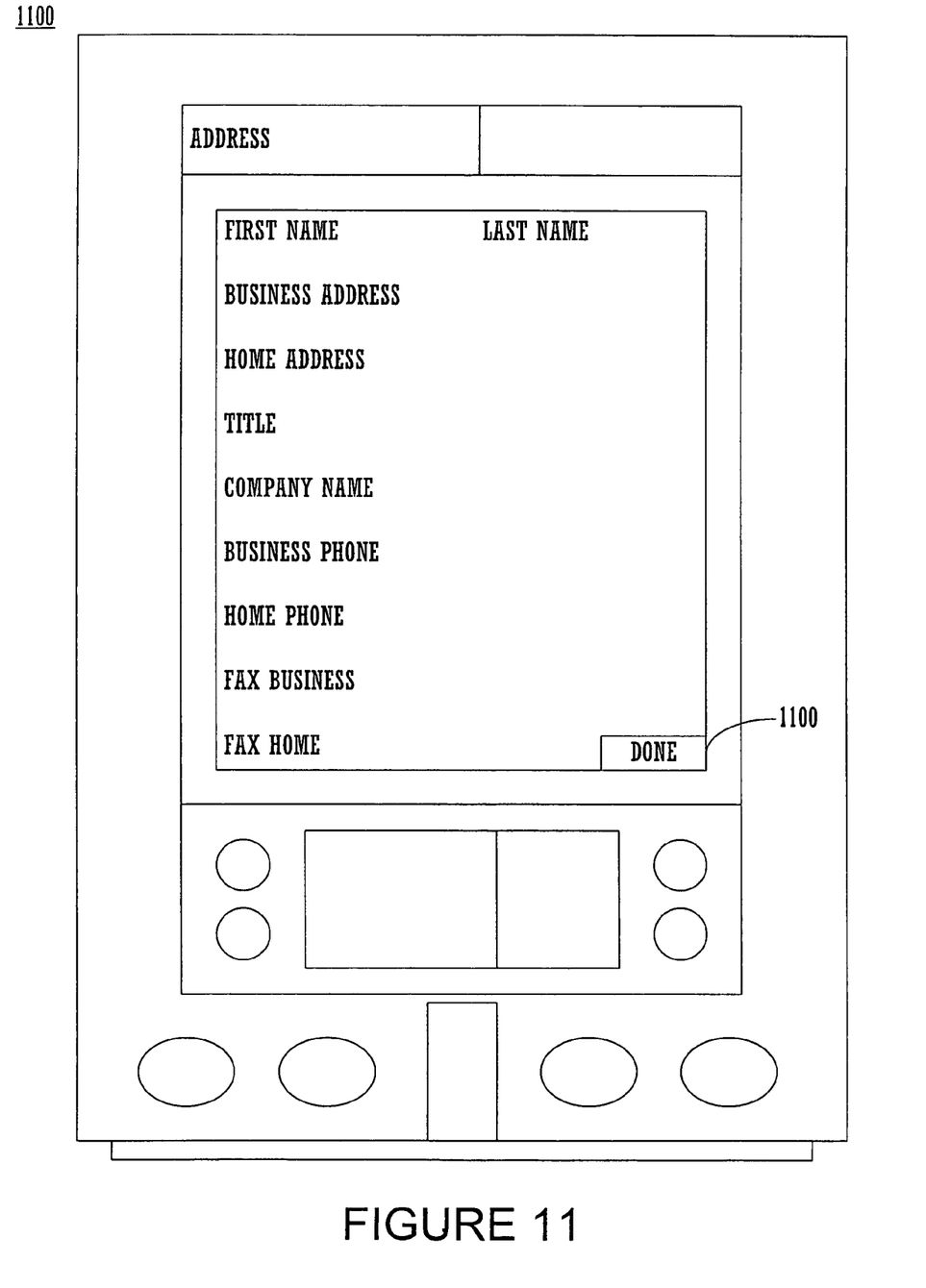
FIG. 11 illustrated the fields within a business or a personal card that can be edited before transmittal.

FIG. 11 is an exemplary view of the data fields within an exemplary card that the user can modify. When the user decides to edit the selected card before beaming, the user taps on the selected field to edit. Once the desired fields are edited the user taps the area of screen marked 1100 and the device automatically beams the edited electronic card to the second device.

What is claimed is:

1. A method of communicating information between electronic devices comprising the steps of:
    defining a plurality of data sets within an electronic address book database comprising a plurality of contact records, wherein said plurality of data sets are for a same individual and wherein said plurality of data sets each comprise a different set of data from different categories of a database records;
    in response to a user request to beam information from a first electronic device to a second electronic device using a wireless medium, displaying a respective label corresponding to each defined data set on a display screen of said first electronic device;
    selecting a selected set of data from said display screen; and
    automatically beaming said selected set of data from said first electronic device to said second electronic device in response to a user indication provided on said first electronic device to last a predetermined duration.

2. The method as described in claim 1 wherein at least one of said plurality of data sets comprise an electronic business card.

3. The method as described in claim 1 wherein said wireless medium is infrared communication.

4. The method as described in claim 1 wherein said request to beam information from said first electronic device to said second electronic device is received in response to the user indication whereby the user presses a button on said first electronic device for the predetermined duration.

5. The method as described in claim 1 wherein said first and second electronic devices are handheld computer systems.

6. The method as described in claim 1 wherein said respective label is selected from the group comprising family, business and personal records.

7. A method of communicating information between electronic devices comprising the steps of:
    defining a plurality of unique data sets for a same individual within an electronic address book database comprising a plurality of contact records;
    in response to a request to beam a data set from a first electronic device to a second electronic device, displaying a respective label corresponding to each defined data set on a display screen of said first electronic device;
    selecting one of said plurality of data sets from said display screen; and
    automatically beaming said selected data set to said second electronic device in response to a user indication on said first electronic device provided to last a predetermined duration.

8. The method as described in claim 7 wherein said selecting one of said plurality data sets from said display screen comprises tapping a screen location corresponding to a label associated with said selected data set.

9. The method as described in claim 7 wherein said first and second electronic devices are handheld computer systems.

10. The method as described in claim 7 wherein said request to beam a data set from said first electronic device to said second electronic device is received in response to the user indication whereby the user presses a button on said first electronic device for the predetermined duration.

11. The method as described in claim 7 wherein said beaming said selected data set to said second electronic device is performed over an infrared communication channel.

12. A method of communicating information between electronic devices comprising the steps of:
    in response to a request to share a data set from a first electronic device to a second electronic device, displaying a plurality of fields of a selected data set on a display screen of said first electronic device, said selected data set selected from a plurality of unique data sets with different data from a database records, each of said data sets for a particular user;
    allowing said user to edit said plurality of fields by interfacing with said display screen and a digitizer of said first electronic device and to create an edited data set; and
    automatically beaming said edited data set from said first electronic device to said second electronic device in response to a user indication on said first electronic device provided to last a predetermined duration.

13. The method as described in claim 12 wherein said first and second electronic devices are handheld computer systems.

14. The method as described in claim 12 wherein said beaming said edited data set to said second electronic device is performed over an infrared communication channel.

15. A system of communicating information between electronic devices comprising the steps of:
    a component for defining a plurality of data sets within an electronic address book database comprising a plurality of contact records, wherein the plurality of data sets are for a same individual and wherein the plurality of data sets each comprise a different set of data from different categories of a database records;
    a display screen associated with the first electronic device for displaying in a respective label corresponding to each defined data set in response to a user request to beam information from a first electronic device to a second electronic device using a wireless medium;
    a component for selecting a selected set of data from the display screen; and
    a transmission medium for automatically beaming the selected set of data from the first electronic device to the second electronic device in response to a user indication on said first electronic device provided to last a predetermined duration.

16. The system as described in claim 15 wherein at least one of the plurality of data sets comprises an electronic business card.

17. The system as described in claim 15 wherein the wireless medium is infrared communication.

18. The system as described in claim 15 wherein the request to beam information from the first electronic device to the second electronic device is received in response to the user indication whereby the user presses a button on the first electronic device for the predetermined duration.

19. The system as described in claim 15 wherein the first and second electronic devices are handheld computer systems.

20. The system as described in claim 15 wherein the respective label is selected from the group comprising family, business and personal records.

* * * * *